United States Patent [19]

Deguchi et al.

[11] Patent Number: 5,294,673
[45] Date of Patent: Mar. 15, 1994

[54] MODIFIED POLYOLEFIN POLYMER, ITS MANUFACTURING METHOD AND RESIN COMPOSITION CONTAINING IT

[75] Inventors: Yoshikuni Deguchi; Kazuya Yonezawa, both of Kobe, Japan

[73] Assignee: Kanegafuchi Kagaku Kogyo Kabushiki Kaisha, Osaka, Japan

[21] Appl. No.: 778,144

[22] PCT Filed: Apr. 24, 1991

[86] PCT No.: PCT/JP91/00552

§ 371 Date: Dec. 26, 1991

§ 102(e) Date: Dec. 26, 1991

[87] PCT Pub. No.: WO91/17192

PCT Pub. Date: Nov. 14, 1991

[30] Foreign Application Priority Data

Apr. 28, 1990 [JP] Japan .................. 2-114462
May 18, 1990 [JP] Japan .................. 2-129473

[51] Int. Cl.$^5$ .......................... C08F 269/00
[52] U.S. Cl. ................................ 525/286
[58] Field of Search ............ 526/273, 348.8; 525/256, 286

[56] References Cited

U.S. PATENT DOCUMENTS

5,166,273 11/1992 Kobayashi et al. .......... 525/286

FOREIGN PATENT DOCUMENTS

63-37109 2/1988 Japan .
63-37109 2/1988 Japan .
63-225619 9/1988 Japan .
WO91/14717 3/1991 PCT Int'l Appl. .

Primary Examiner—Joseph L. Schofer
Assistant Examiner—Wu C. Cheng
Attorney, Agent, or Firm—Armstrong, Westerman, Hattori, McLeland & Naughton

[57] ABSTRACT

The present invention provides a modified polyolefin type polymer having one structural unit having a glycidyl group represented by the following general formula (I) per 2–1,000 repeating units of olefin:

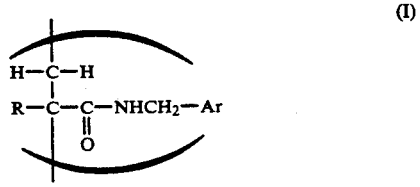

(In the formula, Ar represents an aromatic hydrocarbon group 6–23 in carbon number having at least one glycidyloxy group, and R represents hydrogen atom or methyl group.), its manufacturing method and a resin composition containing the aforementioned modified polyolefin polymer. The polyolefin type polymer of the present invention is excellent not only in mechanical properties, heat resistance and resistance to oil, but also in dyeability, adhesiveness, antistatic property. It enables blending and conversion into alloys for its outstanding affinity with other resins.

5 Claims, No Drawings

MODIFIED POLYOLEFIN POLYMER, ITS MANUFACTURING METHOD AND RESIN COMPOSITION CONTAINING IT

TECHNICAL FIELD OF THE INVENTION

The present invention relates to a modified polyolefin type polymer, its manufacturing method and a resin composition containing it. More particularly, it relates to a modified polyolefin type polymer improved in mechanical properties, heat resistance, dyeability, paintability et cetera, its manufacturing method and resin composition containing it.

In the present invention, the word "polyolefin" is used to include not only polyolefins in a narrow sense but also to include polydienes in a broad sense.

BACKGROUND OF THE INVENTION

A method of copolymerizing unsaturated carboxylic acid anhydride is known for improvement of the mechanical properties, heat resistance, dyeability and paintability of a polyolefin type resin, in a narrow sense, such as polyethylene, polypropylene et cetera. As the unsaturated carboxylic acid, anhydrous maleic acid and analogous ones are used generally and the intended polyolefin type polymers are obtained through copolymerization with olefin type monomers or graft polymerization with polyolefin type polymers. The modified polyolefin type polymers manufactured by such a method are not necessarily improved sufficiently and further improvement is required upon commercialization.

Meanwhile, polydienes such as polybutadiene and polychloroprene are being widely used as rubber materials excellent in mechanical properties, heat resistance and oil resistance. These polydienes, however, are generally high in hydrophobic property and problematic about dyeability, paintability, adhesiveness, antistatic property et cetera. In order to break the conventional notion that rubber is bound to be black, needed is an improvement of its dyeability. But so far, no enough improvement of these properties could be achieved and further improvement of these properties have been sought.

A primary object of the present invention is to provide a new modifying agent to thereby modify the aforementioned polyolefin type polymers or polydiene type polymers for improvement of these polymers in mechanical properties, heat resistance, dyeability, paintability, adhesiveness, antistatic property et cetera.

DISCLOSURE OF THE INVENTION

The present invention, in the first aspect, is aimed at providing a modified polyolefin type polymer having one structural unit of glycidyl group represented by the following general formula (I) per 2-1,000 repeating units of olefin:

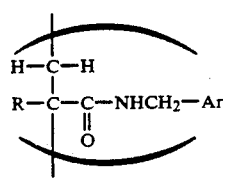
(I)

(In the formula, Ar represents an aromatic hydrocarbon group 6-23 in carbon number having at least one glycidyloxy group, and R represents hydrogen atom or methyl group.)

The present invention is, in the second aspect, to provide a method for manufacturing the aforementioned modified polyolefin type polymer comprising a step of subjecting two components, namely a polyolefin (A) and a modifying agent (B) having glycidyl group represented by the following general formula (III):

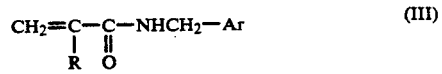

[In the formula, Ar and R are the same as in the general formula (I)], to radical addition by the use of a radical polymerization initiator (C) in the presence or absence of a solvent or a dispersant.

The present invention is, in the third aspect, to provide another method for manufacturing the aforementioned modified polyolefin type polymer comprising a step of copolymerizing an olefin monomer and the modifying agent having glycidyl group represented by the following general formula (III):

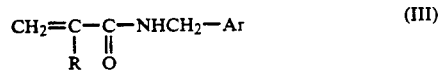

[In the formula, Ar and R are the same as in the general formula (I)].

The present invention is, in the fourth aspect, to provide a resin composition including the aforementioned modified polyolefin type polymers.

BEST MODE FOR PRACTICING THE INVENTION

An important constituent element of the present invention is a structural unit having a glycidyl group represented by the following general formula (I):

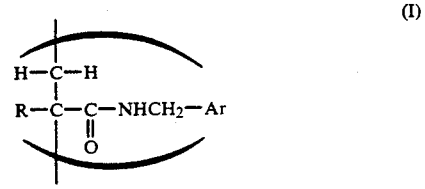

[In the formula, Ar represents an aromatic hydrocarbon group 6-23 in carbon number having at least one glycidyloxy group and R represents hydrogen atom or methyl group] and it derives from a modifying agent having at least one acryl amide group and a glycidyl group, respectively. The acryl amide group also includes, besides acryl amide group, methacryl amide group.

As to such modifying agent, there is no particular structural limitation if it has acryl amide group and glycidyl group, but preferred is a compound represented by the general formula (III):

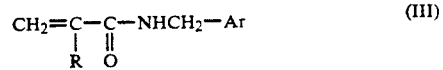

[In the formula, Ar and R are the same as in the general formula (I)].

Such compounds can be manufactured by a method described in Laid-open Patent Publication No. 60-130580. That is, it is obtainable by condensing an aromatic hydrocarbon having at least one phenolic hydroxyl group with N-methylol acrylamide or N-methylol methacrylamide in the presence of an acidic catalyst and then by glycidylization of the hydroxyl group by the use of epihalohydrin. As the aforementioned aromatic hydrocarbon having at least one phenolic hydroxyl group, a phenol compound 6-23 in carbon number is used. As specific examples of the aforementioned phenolic compound, there may be included phenol, cresol, xylenol, carbachlor, thymol, naphthol, resorcin, hydroquinone, pyrogarol and phenantrol. Of these compounds, most preferred may be a mono-valent phenol having alkyl substitution group. When, for example, 2,6-xylenol and N-methylol acryl amide are used as starting materials, a compound represented by the following structural formula (IV) will be obtained:

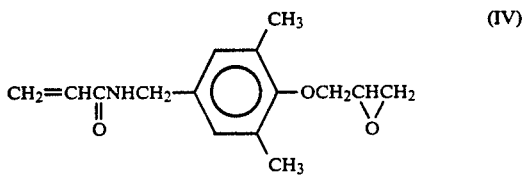

When ortho-cresol and N-methlol acryl amide is used as starting materials, the resultant compound will be of the following structural formula (V):

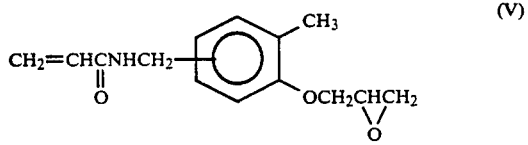

The modified polyolefin type polymers of the present invention contain one structural unit having glycidyl group of the aforementioned general formula (I) per 2-1,000, preferably 5-200 repeating units of olefin. The amide bond in the structural unit of the general formula (I) improves dyeability and paintability, while the glycidyl group contributes to an improvement of not only mechanical strength and heat resistance but also of affinity when it is blended with other resin components. If the proportion of the structural units having a glycidyl group represented by the general formula (I) is less than the aforementioned proportion, no sufficient properties-improving effect is obtainable, while if this proportion is too high, it is not preferable, either, for beneficial innate properties of the polyolefin resin are lost; deterioration of the thermoplasticity and rubber-like characteristics being resulted.

In the modified polyolefin type polymers of the present invention, the structural unit represented by the general formula (I) may possibly exist at random or regularly blockwise, or may as well exist at the end of the molecule or as a graft. There is no particular limitation for the molecular weight of the modified polyolefin type polymers comprising polyethylene, polypropylene, et cetera, but preferably it may be in a range of 3,000-1,000,000 and more preferably 10,000-500,000. When a polydiene is used as a starting material, there is practically no limitation for its molecular weight and selection may be made from those low to high in molecular weight. The polydiene used may be 1, 2-polymer or as well be cis- or trans-1, 4-polymer. The diene unit of the resulting modified polydiene type polymers may again be 1, 2-polymerization or cis- as well as trans-1, 4 polymerization.

There is no particular limitation about the method for manufacturing the modified polyolefin type polymers but the following two methods may be particularly suitable.

The first of these two methods is the so-called polyolefin resin graft modification method, in which two components of a polyolefin (A) and a modifying agent (B) having a glycidyl group represented by the general formula (III)

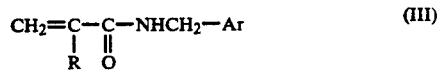

[In the formula, Ar and R are the same as in the general formula (I)]. Are subjected to radical addition by the use of a radical polymerization initiator (C). In this reaction, a proper solvent for dissolving or swelling polyolefins such as tetralin, decalin, toluene, xylene or chlorobenze may be used. Dispersing agents or the like may as well be used. It is also possible to cause a polyolefin resin to react in the molten state by the use of an extruder, kneader, heating roller and the like without using solvent.

There is no limitation about the polymerization initiator used and common radical initiators may be used. For example, peroxides such as cumene hydroperoxide, tertiary butylhydroperoxide, benzoyl peroxide, lauroyl peroxide, decanoyl peroxide and acetyl peroxide or azo compounds such as azobisisobutyronitrile may be used alone or in combination of two or more.

The second manufacturing method is to cause an olefin monomer to copolymerize with a modifying agent (B) represented by the aforementioned general formula (III). There is no particular limitation about the copolymerization method and, besides the common radical polymerization method, a cationic polymerization method, an anionic polymerization method, a coordination polymerization method by the use of a transition metal and the like are also feasible.

As the polyolefins or olefin monomers used in the present invention, there may be included ethylene, propylene, 1-butene, 1-pentene, iso-butene, et cetera; homopolymers thereof; conjugate dienes such as butadiene, isoprene, chloroprene and phenyl propadiene; homopolymers of such conjugate dienes; cyclic dienes such as cyclopentadiene, 1, 5-norbornanediene, 1, 3-cyclohexadiene, 1, 4-cyclohexadiene, 1, 5-cyclooctadiene and 1, 3-cyclooctadiene; homopolymers of these cyclic dienes; α, ω-nonconjugate dienes, etc. Random copolymers and block copolymers of olefins with vinyl compounds, etc., to say nothing of these olefins each other, are usable.

The present invention will be described more specifically with reference to examples, but it is to be noted that the invention is by no means limited thereto.

Unless otherwise noted, "part" and "%" in the following description mean "weight part" and "weight %", respectively.

REFERENCE EXAMPLE

Synthesis of modifying agent

A mixture of 102.6 parts of 4-acryl amide methyl-2, 6-dimethyl phenol, 181 parts of epichlorohydrine and 2.27 parts of benzyltriethyl ammonium chloride were stirred for 30 minutes at 100° C. This reaction mixture was cooled to 50° C., 147 parts of 5N sodium hydroxide was dripped thereto in 10 minutes under stirring, this followed by stirring for 1 hour at 45°–50° C.

The resulting reaction mixture was cooled down to the room temperature, this followed by separation after addition of 120 parts of methylisobutylketone and 500 parts of water. The separated organic layer was rinsed 3 times with 300 parts of water and after dehydration with sodium sulfate anhydride, the solvent was distilled off under reduced pressure and thus N-{4-(2, 3-epoxypropoxy)-3, 5-dimethylphenylmethyl} acryl amide was obtained. The epoxy equivalent weight measured by the method of JIS K 7236 was 271 and the melting point was 90°–92° C.

EXAMPLE 1

100 parts of a polypropylene (AH561 manufactured by Union Polymer Co., Ltd.), 1 part of the modifying agent synthesized in the aforementioned Reference Example and 0.1 part of benzoyl peroxide (Niper BW manufactured by Nippon Oil & Fats Co., Ltd.) were put into a mixer (Laboplastomil manufactured by Toyo Seki Seisakusho) preheated to and kept at 200° C. and kneaded for 5 minutes at 50 rpm. The kneaded mixture was ground, washed 5 times with acetone for elimination of unreacted modifying agent and homopolymer of the modifying agent, and the graft ratio of the modifying agent determined by infrared absorption spectrum and an element analysis of nitrogen atom contained in the resin was 0.7%.

EXAMPLE 2

100 parts of a polypropylene (AH561 manufactured by Union Polymer Co., Ltd.), 5 parts of the aforementioned modifying agent and 0.1 part of dicumyl peroxide (Percumyl D manufactured by Nippon Oil & Fats Co., Ltd.), were dry-blended and supplied to a 44 mm monodirection, biaxial extruder (TEX44 manufactured by The Japan Steel Works, Ltd.) at a rate of 9 kg/h. The temperature of the extruder was set at 210° C. The extruded mixture was cooled with water and after pelletization, dried under reduced pressure for 12 hours at 70° C. After grinding of the resulting dry pellets, the powder was washed 5 times with acetone for elimination of unreacted modifying agent and homopolymer of the modifying agent, and the graft ratio of the modifying agent determined by infrared absorption spectrum and an element analysis of nitrogen atom contained in the resin was 3.6%.

EXAMPLE 3

100 parts of a polypropylene (AH561 manufactured by Union Polymer Co., Ltd.), 10 parts of the aforementioned modifying agent and 0.05 parts of $\alpha$, $\alpha'$-(t-butylperoxy-m-isopropyl) benzene (Perbutyl P manufactured by Nippon Oil & Fats Co., Ltd.), were put together into a mixer (Laboplast Mill manufactured by Toyo Seki Seisakusho) preheated to and kept at 210° C. and kneaded for 5 minutes at 50 rpm. The resulting kneaded mixture was ground, washed 5 times with acetone for elimination of unreacted modifying agent and homopolymer of the modifying agent, and the graft ratio of the modifying agent determined by infrared absorption spectrum and an element analysis of nitrogen atom contained in the resin was 6.5%.

EXAMPLE 4

100 parts of a polyethylene (Hi-Zcx 2200J manufactured by Mitsui Petrochemical Co., Ltd.), 5 parts of the aforementioned modifying agent and 0.1 parts of $\alpha$, $\alpha'$-(t-butylperoxy-m-isopropyl) benzene were dry-blended and extruded by an extruder heated to 200° C. for grafting in the same manner as in Example 1. The resulting dry pellets were ground, and the powder was washed 5 times with acetone for elimination of unreacted modifying agent and homopolymer of the modifying agent, and the graft ratio of the modifying agent determined by infrared absorption spectrum and an element analysis of nitrogen atom contained in the resin was 4.0%.

EXAMPLE 5

100 parts of a polybutadiene (RB-820 manufactured by Japan Synthetic Rubber Co., Ltd.), 1 part of the aforementioned modifying agent and 0.1 parts of benzoyl peroxide (Nipar BW manufactured by Nippon Oil & Fats Co., Ltd.), were put together into a mixer (Laboplast Mill manufactured by Toyo Seiki Seisakusho) preheated to and kept at 100° C. and kneaded for 5 minutes at 50 rpm. The resulting kneaded mixture was ground, washed 5 times with acetone for elimination of unreacted modifying agent and homopolymer of the modifying agent and the graft ratio of the modifying agent determined by infrared absorption spectrum and an element analysis of nitrogen atom contained in the resin was 0.7%.

EXAMPLE 6

100 parts of an EPDM comprising ethylene, propylene and dicyclopentadiene (EP86 manufactured by Japan Synthetic Rubber Co., Ltd.), 3 parts of the aforementioned modifying agent and 0.16 parts of $\alpha$, $\alpha'$-(t-butylperoxy-m-isopropyl) benzene (Perbutyl P manufactured by Nippon Oil & Fats Co., Ltd.) were dry-blended, and with the temperature of the extruder set at 230° C., grafting was carried out in the same manner as in Example 1. The dry pellets obtained were ground and after subsequent washing 5 times with acetone for elimination of unreacted modifying agent and homopolymer of the modifying agent, the graft ratio determined by infrared spectrum and an element analysis of nitrogen atom contained in the resin was 2.1%.

EXAMPLE 7

100 parts of an EPDM comprising ethylene, propylene and 5-ethylidene-2-norbornane (EP57P manufactured by Japan Synthetic Rubber Co., Ltd.), 10 parts of the aforementioned modifying agent and 0.16 parts of $\alpha$, $\alpha'$-(t-butylperoxy-m-isopropyl) benzene (Perbutyl P manufactured by Nippon Oil & Fats Co., Ltd.) were dry-blended, and with the temperature of the extruder set at 230° C., grafting was carried out in the same manner as in Example 1. The dry pellets obtained were ground and after subsequent washing 5 times with acetone for elimination of unreacted modifying agent and homopolymer of the modifying agent, the graft ratio determined by infrared spectrum and an element analysis of nitrogen atom contained in the resin was 7.8%.

EXAMPLE 8

100 parts of an IIR comprising iso-butene and isoprene (Butyl 365 manufactured by Exon), 2 parts of the aforementioned modifying agent and 0.1 parts of α, α'-(t-butylperoxy-m-isopropyl) benzene (Perbutyl P manufactured by Nippon Oil & Fats Co., Ltd.), were put together into a mixer (Laboplast Mill manufactured by Toyo Seiki Seisakusho) whose temperature was set at 250° C. and was kneaded for 5 minutes at 30 rpm. The resulting kneaded mixture was dissolved in n-hexane, then caused to reprecipitate by developing the hexane solution in a large excess of acetone for elimination of unreacted modifying agent and homopolymer of the modifying agent. The graft ratio determined by infrared absorption spectrum and an element analysis of nitrogen atom contained in the resin was 1.1%.

EXAMPLE 9

100 parts of an EPDM (EP57P manufactured by Japan Synthetic Rubber Co., Ltd.), comprising ethylene, propylene and 5-ethylidene-2-norbornane, 3 parts of the aforementioned modifying agent and 0.16 parts of α, α'-(t-butylperoxy-m-isopropyl) benzene (Perbutyl P manufactured by Nippon Oil & Fats Co., Ltd.) were dry-blended and supplied to a 44 mm monodirection, biaxial extruder (TEX44 manufactured by The Japan Steel Works, Ltd.) at a rate of 15 kg/h. The temperature of the extruder was set at 230° C. The extruded mixture was cooled with water and after pelletization, dried under reduced pressure for 12 hours at 70° C. After grinding of the resulting dry pellets, the powder was washed 5 times with acetone for elimination of unreacted modifying agent and homopolymer of the modifying agent, and the graft ratio of the modifying agent determined by infrared spectrum and an element analysis of nitrogen atom contained in the resin was 1.9%.

[Evaluation of adhesiveness]

Evaluation of adhesiveness was made in the following way using the modified polyolefin polymer obtained in Example 2.

For comparison, the same was made of an unmodified polyolefin polymer.

Method of preparing specimen

The dry pellets prepared in Example 2 were frozen at the temperature of liquefied nitrogen and then ground. The powder thus obtained was spread uniformly on two sheets of substrate (aluminum plate 0.2 mm thick, 25 mm wide and 100 mm long) and then pressed for 2 minutes at 250° C. and 20 kg/cm² by the use of an oil hydraulic compression press.

For comparison, a control sample was prepared by the same method as described above with the material polypropylene before modification as an unmodified polyolefin material.

Measuring method

T-peeling strength was measured (n=5) in the following way according to T-peeling strength test (JIS K 6854).

In the test, one end of the stuck part of the specimen was peeled about 10 mm and with both ends thereof caught by the chucks of the tester (Autograph AG-B type manufactured by Shimadzu Seisakusho) the specimen was pulled at a rate of 200 mm/min. at a predetermined temperature and the load required for peeling off was measured.

This T-peeling strength is an indicator for the adhesion strength between the specimen and the substrate, and the larger this value, the higher the adhesiveness. The results of measurement are shown in Table 1.

TABLE 1

| | T-peeling strength (kgf/25 mm) | | | |
|---|---|---|---|---|
| | 23° C. | 50° C. | 100° C. | 150° C. |
| Polypropylene (AH561 manufactured by Union Polymer Co., Ltd.) | 0.1 | 0.1 | 0.1 | 0.1 |
| Modified polypropylene of Example 2 | 13.2 | 10.6 | 8.2 | 3.2 |

[Evaluation of heat resistance]

Using the modified polyolefin type polymer obtained in the aforementioned Example 3, measurement was made of 5% or 10% weight loss temperature and heat resistance was evaluated on the basis of its result.

For comparison, the same evaluation was made also of an unmodified polyolefin (material polypropylene before modification).

Measuring method 10 mg of the specimen prepared in Example 3 was heated to 20°–500° C. at a rate of 10° C./minute by the use of a program temperature controller manufactured by Rigaku Co., Ltd. (Model PTC-10A) and the loss of weight was measured.

5% weight loss temperature means the temperature at which, when heating was done under the above conditions, the weight of the specimen comes to be 95% of that before heating.

10% weight loss temperature means the temperature at which, when heating was done under the above conditions, the weight of the specimen comes to be 90% of that before heating.

5% weight loss temperature and 10% weight loss temperature are both indicators for heat resistance of the specimen and, the larger these values, the higher the heat resistance. The results are shown in Table 2.

TABLE 2

| | 5% weight loss temperature (°C.) | 10% weight loss temperature (°C.) |
|---|---|---|
| Polypropylene (AH561 manufactured by Union Polymer Co., Ltd.) | 280 | 292 |
| Modified polypropylene of Example 3 | 368 | 392 |

POSSIBILITY OF INDUSTRIAL UTILIZATION

Although polyolefin resins are essentially hydrophobic and include problems about dyeability, paintability, adhesiveness and antistatic property, modified polyolefin type polymers of the present invention have solved these problems through introduction of polar groups such as amide group and glycidyl group. The glycidyl group, in particular, when it is caused to react later, is effective for improving mechanical strength, heat resistance and adhesiveness in the interface with different materials.

Taking advantage of such properties, modified polyolefin polymers of the present invention such as polyethylene and polypropylene have numerous application possibilities as materials for fibers, films and a wide variety of moldings. Meanwhile, polydiene type polymers of polybutadiene, isoprene. et cetera with their marked effect of improving adhesiveness in the interface between different materials, are widely useful as elastic structural materials, besides rubber materials, adhesives, tacky adhesives, et cetera.

These modified polymers with their improved affinities for other resin components may be generally usable in place of polyolefin resins which are difficult to blend or convert into alloys. There is no particular limitation about the resins as blending partners, and they may be thermoplastic or as well be thermosetting resins. They may also be mixtures of two kinds or more.

What is claimed is:

1. A modified polyolefin type polymer having one structural unit of glycidyl group represented by the following general formula (I) grafted onto a polyolefin per 2–1,000 repeating units of olefin:

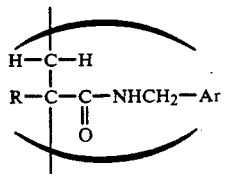 (I)

where, in the formula, Ar represents an aromatic hydrocarbon group 6–23 in carbon number having at least one glycidyloxy group, and R represents hydrogen atom or methyl group.

2. The modified polyolefin type polymer according to claim 1, wherein said structural unit having the glycidyl group is represented by the following formula (II):

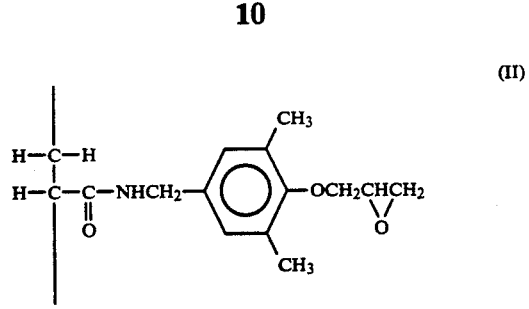 (II)

3. The modified polyolefin type polymer according to claim 1, wherein said repeating unit of olefin is a homopolymer selected from the group consisting of ethylene, propylene, 1-butene, 1-pentene, iso-butene, butadiene, isoprene, chloroprene, phenylpropadiene, cyclopentadiene, 1,5-norbonanodiene, 1,3-cyclohexadiene, 1,4-cyclohexadiene, 1,5-cyclooctadiene and 1,3-cyclooctadiene or a mixture thereof, a copolymer comprising two or more monomers selected therefrom or a mixture thereof or a mixture of said homopolymer and said copolymer.

4. A method of manufacturing the aforementioned modified polyolefin type polymer according to claim 1, comprising a step of subjecting two components, a polyolefin (A) and a modifying agent (B) having glycidyl group represented by the following general formula (III):

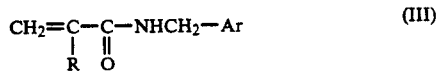 (III)

where, in the formula, Ar and R are the same as in the general formula (I), to graft-polymerization by melting and mixing the two components in the presence of a radical polymerization initiator (C).

5. A resin composition containing the modified polyolefin type polymer according to claim 1.

* * * * *